June 22, 1965

C. B. FITES 3,190,700

AIR RATIO CHANGER AND SYSTEM

Filed Aug. 10, 1961

2 Sheets-Sheet 1

INVENTOR
CYRIL B. FITES
BY *Gravely, Lieder & Woodruff*
ATTORNEYS

United States Patent Office 3,190,700
Patented June 22, 1965

3,190,700
AIR RATIO CHANGER AND SYSTEM
Cyril B. Fites, St. John, Mo., assignor to Wagner Electric Corporation, St. Louis, Mo., a corporation of Delaware
Filed Aug. 10, 1961, Ser. No. 130,671
9 Claims. (Cl. 303—48)

This invention relates to fluid pressure apparatus and more particularly to fluid braking systems and a fluid pressure ratio changer for use in connection with automotive vehicles.

The principal object of the present invention is to provide a fluid pressure control device and a fluid pressure system in which the braking effort at different sets of vehicle wheels will be in a predetermined ratio substantially throughout the range of braking pressures or wherein the braking effort on these sets of wheels will be substantially equal, the control device being selectively operated to effect such wheel pressure ratios.

Another object of the present invention is to provide a novel fluid ratio changing device connected in a brake system of a tractor-trailer train to provide full braking effect during normal operation, and adapted to reduce the braking effect on the tractor rear wheels when the trailer is disconnected from the tractor.

These and still other objects and advantages will become more apparent hereinafter.

The invention is embodied in a fluid pressure system for at least two friction devices, including a fluid pressure source, application means for selectively metering fluid pressure from the source to the friction devices, and novel valve means between the application means and one friction device to reduce the fluid pressure metered thereto upon interruption of fluid pressure connection between the application means and the other friction device.

Figure 1:
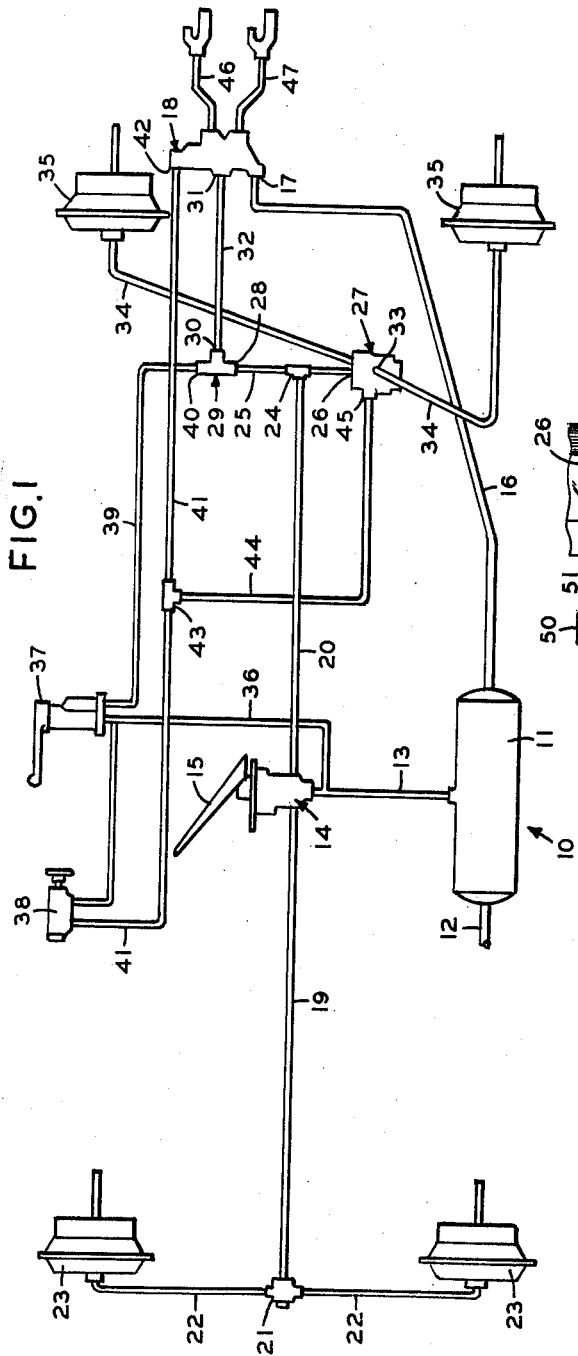
Figure 3:
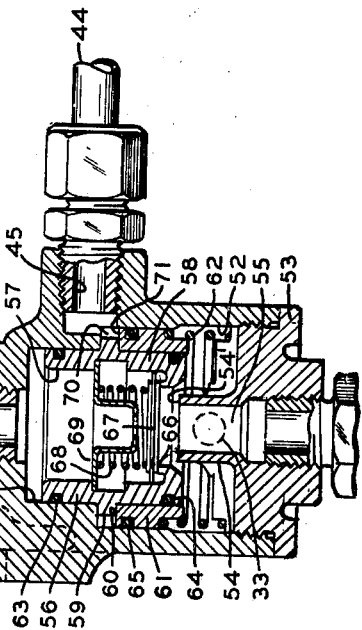
Figure 2:
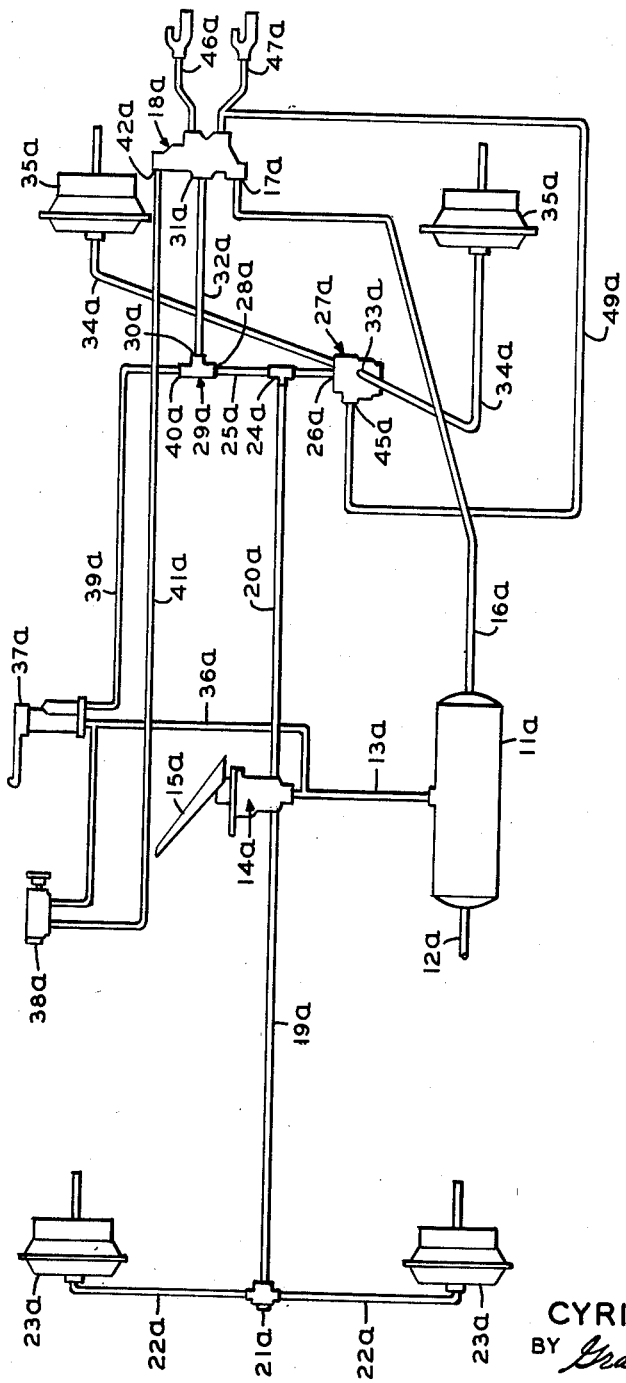

In the accompanying drawings which form a part of the specification and in which like numerals refer to like parts wherever they occur:

FIG. 1 is a diagrammatic view of a tractor brake system embodying the present invention, FIG. 2 is a diagrammatic view showing a modification of the tractor brake system, and FIG. 3 is a vertical cross-sectional view showing a fluid ratio changer device embodying the invention.

Referring now to the drawings, with particular reference to FIG. 1, it will be seen that the tractor brake system 10 embodying the invention includes a fluid pressure reservoir or tank 11 having an inlet conduit 12 from a suitable air compressor (not shown) or the like. The reservoir tank 11 has an outlet conduit 13 connected to an application valve 14 having a foot treadle 15 for operator actuation, and the air tank 11 also has an outlet conduit 16 connected to the tractor emergency port 17 of a conventional tractor protection valve 18. The application valve 14 includes outlet conduits 19 and 20, the former being connected through a quick release valve 21 to branch conduits 22 leading to front wheel brake chambers 23. The outlet conduit 20 from the application valve 14 is connected to a T 24 in a conduit 25 extending between the inlet port 26 of a ratio changer device 27 and one inlet port 28 of a two-way valve 29. The outlet 30 of the two-way valve 29 is connected to the tractor service inlet port 31 of the tractor protection valve 18 by a conduit 32. The outlet ports 33 of the ratio changer device 27 are connected by branch conduits 34 to the rear brake chambers 35 of the tractor.

It will also be seen that the reservoir tank 11 has an outlet conduit 36, branching from the conduit 13, which connects in parallel the inlets of a hand valve 37 and a push-pull valve 38. The outlet of the hand valve is connected by conduit 39 to the other inlet port 40 of the two-way valve 29. The push-pull valve 38 has an outlet connected by conduit 41 to the control port 42 of the tractor protection valve 18, and a T 43 is interposed in the conduit 41 and connects through conduit 44 to the control port 45 of the ratio changer device 27.

The tractor protection valve 18 has outlet conduits 46 and 47 to which the usual trailer service and emergency lines, respectively, are connected. Inasmuch as the tractor protection valve and its connections to the trailer form no part of the present invention further disclosure of this valve is not deemed necessary.

Referring now to FIG. 2 for a brief description of the modified tractor brake system before describing in detail the ratio changer device 27, it will be noted that similar reference numerals used in FIG. 1 have been applied in FIG. 2 with the addition of the letter "a." It will be readily apparent that the major change in systems involves the elimination of the T 43 interposed in the conduit 41 between the push-pull valve 38 and the control port 42 of the tractor protection valve 18 of the FIG. 1 system. Accordingly, it will be seen that the push-pull valve 38a of the FIG. 2 system is connected by conduit 41a directly to the control port 42a of tractor protection valve 18a. The control port 45a of the ratio changer device 27a in FIG. 2 is connected by a conduit 49a which connects to the trailer emergency line 47a which is on the outlet side of the tractor protection valve 18a. The differences in operation of the systems will be pointed out more fully hereinafter.

Referring now to FIG. 3 wherein the details of the ratio changer device 27 are shown, it will be seen that the ratio changer has a casing 50 with coaxially aligned bore 51 and counterbore 52. The inlet port 26 is formed in the casing 50 in direct communication with the bore 51 and the counterbore 52 is closed by an end plug 53 having an axially extending sleeve projection 54 with an exhaust passage 55 normally in communication with the counterbore 52. The upper end 54' of the sleeve 54 forms a valve seat for closing off the exhaust passage 55, as will be described. The outlet ports 33 are formed radially in the counterbore wall below the end 54' of the exhaust passage sleeve 54 whereby the ports 33 are in communication with the counterbore 52 at all times.

A hollow piston member 56 has one end portion 57 slidably positioned in the bore 51 and its other end portion 58 projects into the counterbore 52, an annular flange 59 being formed circumferentially around the piston 56 for abutment with the annular shoulder 60 formed between the bore and counterbore. It will be noted that the end portions 57 and 58 of the piston 56 have substantially equal effective areas. A second piston member 61 of annular construction is slidably positioned in the counterbore 52 between the end portion 58 of the piston 56 and the counterbore wall. A spring 62 has one end seated on the plug 53 and its other end is engaged against the annular piston 61 for biasing the piston against the flange 60 so that the piston members 56 and 61 may be engaged with one another for concert movement. O-ring seals 63 and 65 seal between the end portion 57 of the piston 56 and the bore wall 51 and between the end portion 58 of the piston 56 and the inner wall surface of the annular piston 61, respectively. Another O-ring 65 is provided between the outer surface of the piston 61 and the counterbore wall 52. It will also be noted that the effective end areas of the piston 61 are substantially equal.

The end portion 58 of the piston 56 is formed to provide an annular seal seat 66 extending axially into the hollow interior of the piston 56 in the same direction as the sleeve seat 54', and a resilient seal 67 is biased by spring 68 downwardly against the seat 66 and toward the seat 54'. The other end of the spring 63 is seated against a spring retainer 69. The spring retainer 69 and the carrying element for the resilient seal 67 are perforated to permit the free flow of liquid through the hollow piston member 56 except as restricted when the resilient seal 67 is seated against the seat 66.

The control port 45 is in fluid communication with the annular shoulder 60 intermediate the bore and counterbore whereby fluid pressure exerted through the conduit 44 and the inlet 26 to the annluar control chamber 70 defined by the shoulder 60, annular flange 59 and end portion 71 of the annular piston 61 will be exerted on the annular piston 61 in opposition to the force of the spring 62 acting thereagainst.

In normal operation of the present fluid pressure brake system shown in FIG. 1, assuming that a trailer is connected to the tractor and has its independent brake system connected to the service and emergency lines 46 and 47 on the outlet side of the tractor protection valve 18 in a typical hook-up, the push-pull valve 38 will be open to connect the fluid reservoir 11 through lines 13, 36 and 41 to the control port 42 of the tractor protection valve 18. The presence of tank pressure in the tractor protection valve moves the inner valve elements thereof to establish communication through the valve 18 between the tractor and trailer service lines and the tractor and trailer emergency lines. It is apparent that the fluid pressure of the reservoir tank 11 will also be applied through conduit 44 to the control port 45 of the ratio changing device 27 whereby the presence of tank pressure in the annular control chamber 70 will be effective upon the end 71 of the annular piston 61 to move this piston downwardly in the counterbore 52 against the biasing action of the spring 62 into abutment with the plug 53. Inasmuch as the tank pressure will normally exceed, or at least be equal to, the metered pressure in the counterbore 52 and outlet ports 33 during a braking application, it is apparent that the annular piston 61 will be effectively rendered inoperative in normal operation of the system of FIG. 1.

In a normal braking application, the foot treadle 15 is depressed by the operator to meter fluid pressure from the reservoir 11 through the application valve 14 and the conduit 19, quick release valve 21, branch conduits 22 and into the brake chambers 23 to energize the front wheel friction members. The same fluid pressure is also metered through the conduit 20 and conduit 25 to the two-way valve 29 thereby biasing the valve element (not shown) upwardly to close off the inlet 40 and provide communication through the two-way valve 29 to the conduit 32 to the tractor protection valve service inlet 31. The fluid communication through the tractor protection valve 18 to the trailer service line will be effective to energize the trailer friction devices. The fluid pressure in the conduit 20 from the application valve 14 will also be applied in the inlet 26 of the ratio changer 27. The metered fluid pressure in the bore 51 of the ratio changer 27 acts on the effective end area of the end portion 57 of the piston 56, and upon the effective area of the sealing unit 67 to move the piston 56 downwardly in the bore and counterbore whereby the seat end 54' of the exhaust passage sleeve 54 will sealably receive the sealing element 67 to close off the exhaust passage 55. Further movement of the piston 56 downwardly will unseat the seal element of the piston 56 from the annular seat 66 formed integral with the 67 thereby establishing fluid communication through the hollow interior of the piston and around the sleeve 54 through the counterbore 52 and outwardly through the outlet ports 33 to the branch conduits 34 leading to the brake chambers 35 of the rear wheel friction members.

It will be apparent that during normal operation the ratio changing device 27 is disabled and permits full braking efforts to be applied to all friction members of both the tractor and the trailer. In the even the trailer is disconnected from the tractor so that the service and emergency lines 46 and 47 are disconnected, the push-pull valve is moved to a closed position to interrupt communication between the reservoir tank 11 and the control port 42 of the tractor protection valve 18. The control port 42 of the tractor protection valve is exhaused to atmosphere through the push-pull valve thereby permitting the internal valve elements to move to closed positions for isolating the tractor service and emergency inlet ports from the trailer outlet ports of the tractor protection valve. The control port 45 of the ratio changer 27 is also exhausted to atmosphere through the push-pull valve 37 when it is in closed position, whereby the force of the spring 62 will bias the annual piston 61 upwardly in the counterbore 52 into abutment with the annular flange 59 thereby maintaining the piston 56 and 61 in abutting engagement with each other and with the shoulder 60 between the bore and counterbore. Under these conditions, metered fluid pressure in the inlet port 26 of the ratio changer 27 will act on the effective area of the upper end portion 57 and seal 67 to move the piston members 56 and 61 downwardly in concert action against the biasing action of the spring 62, which is of negligible force. When the seal 67 is engaged on the end seat 54' and is unseated from the annular seat 66 of the piston 56, fluid pressure will be metered through the hollow interior of the piston 56 into the counterbore 52 to the branch conduits and rear brake chambers until this outlet fluid pressure acting on the effective areas of the pistons 56 and 61 in opposition to the metered fluid pressure in the bore 51 develops a reactive force equal to the force of the inlet fluid pressure acting on the upper end area of the piston 56. At such time, the pistons 56 and 61 will move to a lapped position of the seal 67 on the seats 66 and 54'. The larger effective area of the piston members in the counterbore 52 will, of course, produce a lower fluid pressure in the outlet ports 33 and on the rear brake cylinders 35. The ratio thus established between the inlet and outlet ports of the ratio changer 27 will be maintained throughout the remainder of the braking application. Upon termination of the braking application, the fluid pressure in the inlet of the ratio changer will be exhausted through the application valve 14 and upward movement of the piston members 56 and 61 by the action of spring 62 will open the exhaust passage 55 whereby fluid pressure in the rear brake cylinders will be exhausted therethrough.

Referring to the system shown in FIG. 2, the operation of the ratio changer in the system is substantially identical to that shown in FIG. 1. However, inasmuch as the control port 45a of the ratio changer 27a is connected to the trailer emergency line 47a on the outlet side of the tractor protection valve 18a, upon any break in the emergency line 47a or appreciable loss of fluid pressure (or when the trailer is disconnected from the tractor) the fluid pressure in the control chamber 70 will also be reduced or lost thereby moving the annular piston 61 into abutment with the piston 56 for concert movement therewith in order to produce a reduced braking effort on the rear brake cylinders 35 as previously disclosed.

From the foregoing, it will now be apparent that the present brake system and novel ratio changer provide a simple efficient means for controlling fluid pressure proportioning between different sets of wheels of a tractor and that the objects set out herein have been met.

The invention is intended to cover all changes and modifications of the present disclosure which will be readily apparent to all skilled in the art, and the invention is limited only by the claims which follow.

What I claim is:

1. A control valve for controlling fluid pressure applied from a source to a motor of a fluid pressure system comprising a housing, a pair of fluid pressure responsive members cooperable to provide differential areas and adapted for concerted and independent movement in said housing, means within said housing including said members providing a pressure fluid flow passage for connection between said source and motor, valve means in one of said members for controlling pressure fluid flow through said flow passage, said members being concertedly movable in response to applied fluid pressure from said source to move said valve means to a position in said flow passage establishing flow of the applied fluid pressure therethrough to said motor, the established fluid pressure at said motor acting on said members to oppose further concerted movement thereof and being in a predetermined ratio with the applied fluid pressure, and other means within said housing defining with said members a fluid pressure chamber, the other of said members being independently movable to a disabled position in said housing in response to fluid pressure in said chamber in excess of that at said motor and said one member being thereafter independently movable in response to the applied fluid pressure to actuate said valve means and establish another ratio between the applied and established fluid pressures different than the predetermined ratio.

2. A control valve for fluid pressure comprising a housing having inlet, outlet and exhaust ports therein, a pair of fluid pressure responsive members movable in said housing and cooperable to provide differential areas, means engaged between said members for providing concerted movement thereof, valve means in one of said members controlling pressure fluid communication between said ports, said members being concertedly movable in response to fluid pressure at said inlet port and acting on said one member to move said valve means to a position interrupting pressure fluid communication between said outlet and exhaust ports and establishing pressure fluid communication between said inlet and outlet ports, the established fluid pressure at said outlet port acting on said members to oppose further concerted movement thereof and being in a predetermined ratio with that at said inlet port, and a control port in said housing, the other of said members being independently moved to a position in said housing effecting the disengagement of said first named means in response to fluid pressure at said control port in excess of that at said outlet port and said one member being thereafter movable relative to said other member in response to fluid pressure at said inlet port to actuate said valve means and establish fluid pressure at said outlet port in a ratio with that at said inlet port different than the predetermined ratio.

3. A control valve for fluid pressure comprising a housing having an aligned bore and counterbore therein, an inlet port connected with said bore and an outlet port connected with said counterbore, a first piston slidable in said bore and extending coaxially into said counterbore, a second piston slidable in said counterbore and cooperable with said first piston to provide differential areas, another bore in said second piston, said first piston having a peripheral portion slidable in said other bore, a connecting passage extending through said first piston between said housing bore and counterbore, a first valve seat on said first piston in circumscribing relation with said connecting passage, valve means in said connecting passage and normally urged into engagement with said first valve seat to interrupt pressure fluid communication between said inlet and outlet ports, extension means on said housing and extending coaxially into said counterbore, said extension means having a free end portion defining a second valve seat for engagement with said valve means, an exhaust port in said extension means extending coaxially through said second valve seat and normally communicating said outlet port with the atmosphere, abutment means on said first piston for engagement with said second piston, resilient means normally urging said second piston into engagement with said abutment means, said first and second piston being initially concertedly movable in response to fluid pressure at said inlet port acting on said first piston to move said valve means into engagement with said second valve seat closing said exhaust port and said first and second piston being thereafter movable relative to said valve means to disengage said first valve seat therefrom and open said connecting passage thereby establishing pressure fluid communication between said inlet and outlet ports, the magnitude of the established fluid pressure at said outlet port acting on said first and second pistons to oppose further concerted movement thereof and being in a predetermined ratio with that of the fluid pressure at said inlet port acting on said first piston, an annular shoulder defined in said housing between said bore and counterbore, an annular fluid pressure chamber defined in said housing between said shoulder and second piston and between the side wall of said counterbore and the peripheral portion of said first piston extending into said counterbore, a control port in said housing connected with said chamber, said second piston being movable relative to said first piston to a disabled position in said housing disengaged from said abutment means in response to fluid pressure at said control port having a magnitude in excess of that of established fluid pressure at said outlet port and said first piston being thereafter movable in response to fluid at said inlet port to actuate said valve means and effect established fluid pressure at said outlet port having a magnitude in a ratio with that of the fluid pressure at said inlet port different than the predetermined ratio.

4. Control valve means for controlling the ratio between fluid pressure applied from a fluid pressure source to a fluid pressure responsive motor comprising a housing, a pair of concertedly and independently movable application means in said housing for controlling passage of applied fluid pressure from said source to said motor and cooperable to provide differential areas, said pair of application means being concertedly movable in response to applied fluid pressure from said source to establish a fluid pressure at said motor opposing further concert movement of said application means and in a predetermined ratio with that applied from said source, and means for disabling one of said application means, the other of said application means being thereafter independently movable in response to the applied and established fluid pressures to effect a ratio therebetween different than the predetermined ratio.

5. A control valve for fluid pressure comprising a housing having inlet, outlet and exhaust ports therein, a pair of fluid pressure responsive members cooperable to provide differential areas and adapted for concerted and independent movement in said housing between said inlet port and said outlet and exhaust ports, a passage in one of said members, a first valve seat in said one member in circumscribing relation with said passage, valve means in said one member and normally urged into engagement with said valve seat to interrupt pressure fluid communication between said inlet and outlet ports and establish pressure fluid communication between said outlet and exhaust ports, a second valve seat on said housing in circumscribing relation with said exhaust port, said members being initially concertedly movable in one direction in response to fluid pressure at said inlet port to move said valve means into engagement with said second valve seat interrupting pressure fluid communication between said outlet and exhaust ports and thereafter concertedly movable in the one direction relative to said valve means to disengage said first valve seat therefrom establishing pressure fluid communication through said passage between said inlet and outlet ports, the established fluid pressure at said outlet port acting on said members to concertedly move said members in the opposite direction relative to said valve means to re-engage said first valve seat with said valve means, said established fluid pressure at said outlet port being in a predetermined ratio with that at said inlet port upon the reengagement of said valve means with said first and second valve seats, means within said housing defining with said members a fluid pressure chamber, and a control port in said housing connected with said chamber, the other of said members being disabled in response to fluid pressure at said control port at least equal to that at said outlet port and said one member being thereafter movable in response to applied and established fluid pressures at said port and outlet ports, respectively, to actuate said valve means and establish another ratio between said applied and established fluid pressures different than the predetermined ratio.

6. A control valve for fluid pressure comprising a housing having inlet, outlet and control ports therein, a pair of concentric pistons slidable in said housing between said inlet and outlet ports and defining with said housing an outlet chamber connected with said outlet port, one of said pistons defining with said housing an inlet chamber connected with said inlet port, said pistons being cooperable to provide differential areas, a connecting passage in said one piston between said inlet and outlet chambers, valve means normally urged to a closed position in said connecting passage interrupting communication between said inlet and outlet ports, said pistons being concertedly movable in response to fluid pressure applied at said inlet port to move said valve means to an open position in said connecting passage and establish pressure fluid communication between said inlet and outlet ports, the established fluid pressure at said outlet port acting on said pistons to oppose further concert movement thereof and being in a predetermined ratio with that at said inlet port, the other of said pistons being slidable in said housing between said control and outlet ports and defining with said one piston and housing a control chamber connected with said control port, said other piston being movable independently of said one piston to a disabled position in abutting engagement with a portion of said housing in said outlet chamber in response to fluid pressure at said control port in excess of that at said outlet port and said one piston being movable independently of said other piston in the disabled position thereof in response to fluid pressure at said inlet and outlet ports to actuate said valve means and establish another ratio therebetween different than the predetermined ratio.

7. A control valve for fluid pressure comprising a housing having inlet and outlet ports therein, a pair of fluid pressure responsive members cooperable to provide differential areas and adapted for concerted and relative movement in said housing between said ports, valve means in one of said members controlling pressure fluid communication between said ports, said members being concertedly movable in response to applied fluid pressure at said inlet port to move said valve means to a position establishing pressure fluid communication between said ports, the established fluid pressure at said outlet port acting on said members to oppose further concerted movement thereof and being in a predetermined ratio with that at said inlet port, a control port in said housing between said inlet and outlet ports, the other of said members being movable in said housing between said control and outlet ports and movable to a disabled position in said housing in response to fluid pressure at said control port in excess of that at said outlet port, and said one member being thereafter relatively movable in response to the fluid pressures at said inlet and outlet ports to actuate said valve means and establish a different ratio between the fluid pressures at said inlet and outlet ports.

8. A ratio changing valve comprising a housing having inlet, outlet and control chambers therein, a first movable member having opposed substantially equal end areas subjected to fluid pressure in said inlet and outlet chambers, respectively, a second movable member having opposed substantially equal end areas subjected to fluid pressure in said control and outlet chambers, respectively, said second member being normally biased into engagement with said first member, a connecting passage in said first member between said inlet and outlet chambers, and valve means normally urged to a closed position in said connecting passage, said members being movable in concert in response to fluid pressure in said inlet chamber for moving said valve means to an open position in said connecting passage providing the passage of applied fluid pressure therethrough into said outlet chamber, said members being responsive when the fluid pressures in said inlet and outlet chambers are substantially inversely proportional to the respective end areas of said members subjected to the fluid pressures in said inlet and outlet chambers to move said valve means to the closed position thereof, and said second member being removable from engagement with said first member to a disabled position in said housing in response to fluid pressure in said control chamber having a magnitude in excess of that of the fluid pressure in said outlet chamber whereby said first member is thereafter movable independently of said second member in response to applied fluid pressure in said inlet chamber to actuate said valve means and effect a substantially equal fluid pressure in said outlet chamber.

9. A control valve for controlling the ratio of fluid pressure applied from a fluid pressure source to a fluid pressure responsive motor comprising a housing, a first fluid pressure responive member in said housing and defining therewith an inlet chamber for connection with fluid pressure applied from said source, a second fluid pressure responsive member defining with said housing and said first member an outlet chamber for connection with said motor, said first and second members being cooperable to provide differential areas and adapted for concerted and independent movement in said housing, passage means in said first member between said inlet and outlet chambers, valve means in said first member controlling pressure fluid flow through said passage means, and first and second members being concertly movable in response to applied fluid pressure in said inlet chamber to move said valve means to a position providing pressure fluid flow through said passage means to establish fluid pressure in said outlet chamber, said established fluid pressure opposing further concerted movement of said first and second members and being in a predetermined ratio with that in said inlet chamber, and another fluid pressure chamber defined between said first and second members and said housing, said second member being independently movable to a disabled position in said housing in response to fluid pressure in said other chamber in excess of the established fluid pressure in said outlet chamber and said first member being thereafter independently movable to actuate said valve means in response to applied and established fluid pressures in said inlet and outlet chambers to provide another ratio therebetween different than the predetermined ratio.

References Cited by the Examiner

UNITED STATES PATENTS

| | | | |
|---|---|---|---|
| 2,100,053 | 11/37 | Hill et al. | 303—7 |
| 2,206,656 | 7/40 | Boldt | 303—7 |
| 2,406,284 | 8/46 | Fitch | 137—102 |
| 2,545,512 | 3/51 | Campbell | 303—40 |
| 2,725,073 | 11/55 | Edge et al. | 137—493.4 |
| 2,742,054 | 4/56 | Poundstone | 137—522 |
| 2,919,165 | 12/59 | Cotter et al. | 303—40 X |
| 2,986,427 | 5/61 | McClure et al. | 303—60 X |
| 3,002,520 | 10/61 | Morse | 137—102 |
| 3,006,694 | 10/61 | Valentine et al. | 303—22 |
| 3,018,139 | 1/62 | Stelzer | 303—60 |

EUGENE G. BOTZ, *Primary Examiner.*

ABRAHAM J. GOLDBERG, ARTHUR L. LA POINT,
*Examiners.*